Figure 1:
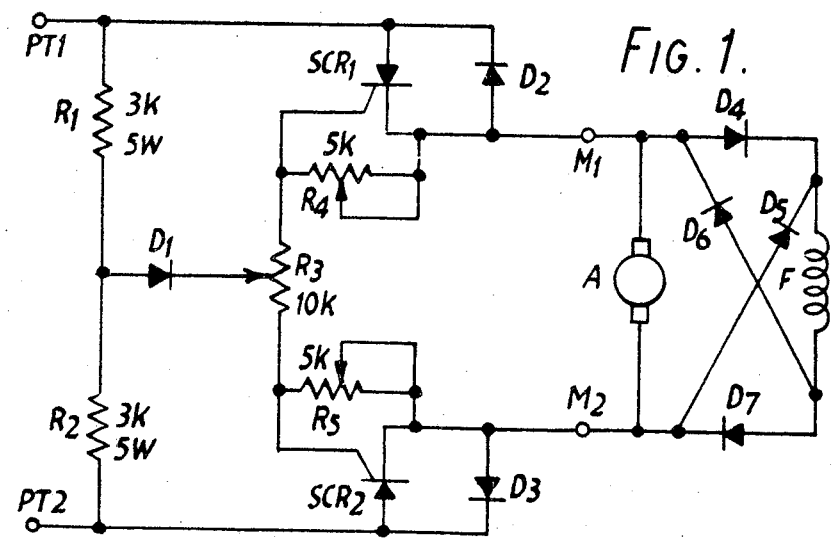

United States Patent [19]
Chiles

[11] 3,753,065
[45] Aug. 14, 1973

[54] METHOD OF REGULATING AND CONTROLLING SPEED AND DIRECTION OF ELECTRIC MOTORS AND APPLIANCE

[75] Inventor: Seaborn Howard Chiles, San Francisco, Calif.

[73] Assignee: Chiles (Patents and Systems) Limited, Hong Kong, Hong Kong

[22] Filed: Oct. 29, 1971

[21] Appl. No.: 193,912

[52] U.S. Cl. .................................. 318/257, 318/295
[51] Int. Cl. ............................................. H02p 5/16
[58] Field of Search .................... 318/256, 257, 291, 318/293, 295, 373, 374

[56] References Cited
UNITED STATES PATENTS

| | | | |
|---|---|---|---|
| 3,214,667 | 10/1965 | Foster | 318/345 |
| 3,593,077 | 7/1971 | Loshbough | 318/293 |
| 3,188,542 | 6/1965 | Dietrich | 318/257 |
| 3,209,227 | 9/1965 | Berman | 318/257 |
| 3,249,838 | 5/1966 | Mierendorf | 318/293 |
| 3,568,024 | 3/1971 | Robbins | 318/293 |

Primary Examiner—Bernard A. Gilheany
Assistant Examiner—Thomas Langer
Attorney—E. F. Wenderoth et al.

[57] ABSTRACT

A control circuit for a reversible electric motor to be driven from an a.c. supply. Two thyristors are connected on respective sides of the motor in a series circuit including the thyristors, the motor and the a.c. terminals. The thyristors are inversely connected with respect to each other and a potentiometer is connected with respective ends to the thyristor trigger electrodes. A potential divider is connected across the supply terminals and there is a connection between the potential divider and the wiper on the potentiometer.

10 Claims, 3 Drawing Figures

PATENTED AUG 14 1973 3,753,065

METHOD OF REGULATING AND CONTROLLING SPEED AND DIRECTION OF ELECTRIC MOTORS AND APPLIANCE

The invention relates to a control circuit for a reversible electric motor, by which is meant an electric motor whose direction of rotation is determined by the direction of the supply current thereto.

According to the invention there is provided a control circuit for a reversible electric motor, the circuit comprising: first and second terminals for the motor; first and second terminals for an a.c. supply; a first thyristor connected with its anode/cathode path in series between the first supply terminal and the first motor terminal; a second thyristor connected with its anode/cathode path in series between the second supply terminal and the second motor terminal, the thyristors being inversely connected with respect to the current path from the supply terminal; a diode connected inversely across each thyristor; a potentiometer connected with respective ends to the trigger electrodes of the thyristors; a potential divider connected across the supply terminals and a circuit connection between a tap on the potential divider and the wiper of the potentiometer.

Preferably there is a diode in series in the circuit connection connected with its cathode connected ot the wiper of the potentiometer.

Preferably there is provided an adjustable biasing resistor connected between the cathode and the trigger electrode of each thyristor to compensate for differences in S C R and motor characteristics.

The invention also includes within its scope a control circuit of the kind described above in combination with the electric motor to be controlled connected between the two motor terminals. The motor, being reversible, may have a permanent armature or field constituted by a permanent magnet or having a winding supplied from a separate direct-current source. However, preferably the motor is a universal motor, namely a motor with wound armature and field windings without a separate direct-current supply. In order to make such a motor reversible it is preferred to derive a unidirectional current for the field winding or the armature from the applied motor current which may be of either polarity. To this end, it is preferred that the armature or field winding be connected in a full-wave bridge rectifier circuit constituted by four diodes included in the motor. The motor may be shunt wound or series wound.

Figure 2:
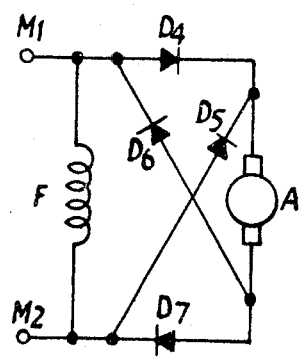
Figure 3:
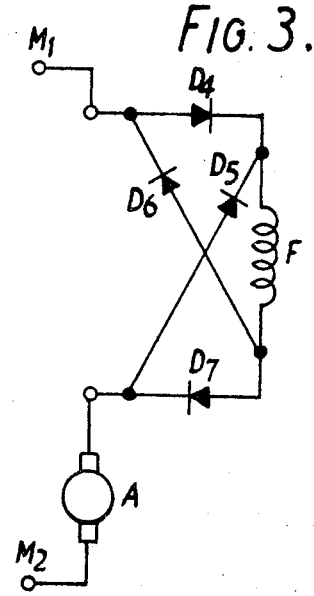

The invention will further be described with reference to the acompanying drawings, of which:

FIG. 1 is a circuit diagram of a control circuit according to the invention in combination with an electric motor; and FIGS. 2 and 3 are circuit diagrams showing alternative configurations for the motor.

Referrring to FIG. 1 the circuit is for controlling an electric motor constituted by an armature A and a field winding F connected across motor terminals M1 and M2. Current supply for the motor is derived from a supply of 120 volts. a.c. at 60 Hz connected across terminals PT1 and PT2. It will be appreciated that the voltage and frequency given are exemplary only and the invention is applicable to other supply and motor voltages and frequencies. The speed of the motor is controlled by two thristors, or silicon controlled rectifiers SCR1 and SCR2. Thyristor SCR1 is connected with its anode to terminal PT1 and its cathode to terminal M1 whereas thyristor SCR2 is connected with its anode to terminal PT2 and its cathode to terminal M2. Diodes D2 and D3 are connected inversely across thyristors SCR1 and SCR2 respectively. It will be seen that for one direction of current flow a controlled current is passed through thyristor SCR1, through the motor, and through diode D3. For the other direction of current flow the current is controlled by thyristor SCR2, passes through the motor and through diode D2. Thyristor SCR1 may conduct during positive half cycles of the supply (when terminal PT1 is positive with respect to terminal PT2) and thyristor SCR2 may conduct during negative half-cycles of the supply.

The amount of current allowed to pass through the motor is controlled by the conduction period in each half-cycle of the respective thyristor. This conduction time is controlled by the setting of a potentiometer R3, the ends of which are connected to the trigger electrodes of the respective thyristors. A potential divider is constituted by the resistors R1 and R2 connected across terminals PT1 and PT2. The tap on the potential divider is connected through a circuit connection including a diode D1 (a safety device used to prevent negative pulses at the gate which could destroy the SCR) to the wiper of potentiometer R3. Resistors R1 and R2 are of suitable balancing values and with the wiper of the potentiometer at its central position the circuit is balanced and any current which flows through diode D1 is insufficient to trigger SCR1 of SCR2. This is because of variable resistors R4 and R5 which are connected respectively between the trigger electrode and the cathode of thyristors SCR1 and SCR2. These variable resistors are set so that with the wiper of the potentiometer centered, both thyristors are biased off. Under these circumstances neither thyristor is triggered and no current passes to the motor. If, from this position, the wiper of the potentiometer is moved towards the end connected to thyristor SCR1 then the thyristor will be triggered to conduct in each positive half-cycle of the supply for a conduction period determined by the setting of the wiper. This will allow positive current to flow in pulses through the motor and the motor will turn in one direction. If the potentiometer wiper is now returned to the central position the motor will slow and stop. If the wiper is now moved in the other direction the thyristor SCR2 will be triggered to conduct during negative half-cycles for conduction periods dependent upon the setting of the potentiometer wiper. This will allow the motor to turn in the opposite direction.

The setting of the variable resistors R4 and R5 determines the bias condition for the thyristors and governs the point at which they start to conduct in each half-cycle. In this way the width of the "flat spot" in the centre of the potentiometer during which the motor does not turn can be adjusted and also compensation can be made for differences in SCRs and motors.

With the circuit described there is a feedback effect which automatically regulates the speed of the motor against the effect of increasing or decreasing load. When the potentiometer is set to give a predetermined speed of rotation the motor will receive pulses of current of a certain width or number of degrees of the sine-wave in each half cycle and will run at a corresponding speed. Should the load on the motor then be increased the motor will tend to slow. However, under these conditions the back e.m.f. generated by the motor will fall off. This back e.m.f. tends to back-off the trigger potential applied through diode D1 since it opposes the driving potential across the potential divider R1, R2. Therefore, if the back e.m.f. falls off the effect is to increase the thyristor conduction time in each half-cycle of the supply and thereby increase the torque of the motor so that speed is maintained. Conversely, if the load on the motor should decrease the resultant tendency for the back e.m.f. to increase will reduce the thyristor conduction time and the tendency for the motor speed to rise will be inhibited.

The motor shown in FIG. 1 is a universal shunt motor which has been modified. The modification consists in supplying the field winding F from the output of a full-wave bridge rectifier constituted by diodes D4 and D7. It will be seen that whatever the direction of current supplied to the motor, the direction of current flowing through the field winding remains the same. This means that if the motor current is reversed then only the armature current will be reversed and the armature will turn in the opposite direction.

Referring to FIG. 2 there is shown an alternative arrangement for the motor in which the armature, instead of the field winding is supplied from the output of the bridge rectifier.

In FIG. 3 there is shown another alternative arrangement for the motor in which the armature and field winding are connected in series, the bridge rectifier being again connected to supply the field winding. However, it will be appreciated that the bridge rectifier may alternatively be arranged to supply the armature in this configuration also.

It will be seen that in the arrangements described above with reference to the accompanying drawings there is no manually operated mechanical switch for reversing the motor.

There are many applications for a control circuit of the kind described with reference to the drawings. The motor control is particularly smooth and progressive and therefore the electric motor may be provided to control any equipment requiring a smooth and accurate control characteristic. For example, the motor may be used to control cranes; large fluid gate valves where there may be a danger of large hydraulic surges or hydraulic ram effects; film projectors; sewing machines; hospital beds; hydraulic valves on bulldozers and earth moving machines; chain hoists; cable hoists; lifts and cargo handling equipment.

I claim:

1. A control circuit for a reversible electric motor, the circuit comprising: first and second terminals for the motor; first and second terminals for an a.c. supply; a first thyristor connected with its anode/cathode path in series between the first supply terminal and the first motor terminal; a second thyristor connected with its anode/cathode path in series between the second supply terminal and the second motor terminal, the thyristors being inversely connected with respect to the current path from the supply terminal; a diode connected inversely across each thristor; a potentiometer connected with respective ends to the trigger electrodes of the thyristors; a potential divider connected across the supply terminals and a circuit connection between a tap on the potential divider and the wiper of the potentiometer.

2. A control circuit as claimed in claim 1 wherein there is a diode in series in the circuit connection connected with its cathode connected to the wiper of the potentiometer.

3. A control circuit as claimed in claim 1 wherein there is provided an adjustable biasing resistor connected between the cathode and the trigger electrode of each thyristor.

4. The combination of a control circuit as claimed in claim 1 with an electric motor connected between the motor terminals.

5. The combination claimed in claim 4 wherein the motor is a universal type motor and means are provided for supplying the field winding thereof with unidirectional current of either polarity.

6. The combination claimed in claim 5 wherein the means for supplying the field winding comprises a rectifier arrangement for deriving the unidirectional current from the current supplied to the motor terminals.

7. The combination as claimed in claim 6 wherein the field winding is connected in a full-wave bridge rectifier circuit consituted by four diodes included in the motor.

8. The combination claimed in claim 4 wherein the motor is a universal type motor and means are provided for supplying the armature winding thereof with unidirectional current of either polarity.

9. The combination claimed in claim 8 wherein the means for supplying the armature winding comprises a rectifier arrangement for deriving the unidirectional current from the current supplied to the motor terminals.

10. The combination as claimed in claim 9 wherein the armature is connected in a full-wave bridge rectifier circuit constituted by four diodes included in the motor.

* * * * *